United States Patent
Gomez et al.

(10) Patent No.: US 7,925,724 B2
(45) Date of Patent: Apr. 12, 2011

(54) VOLUME MAPPING BY BLADE SLOT

(75) Inventors: Raymond R. Gomez, Tucson, AZ (US); Esteban Rios, Tucson, AZ (US); Ashaki A. Ricketts, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 507 days.

(21) Appl. No.: 11/846,450

(22) Filed: Aug. 28, 2007

(65) Prior Publication Data

US 2009/0063495 A1  Mar. 5, 2009

(51) Int. Cl.
G06F 15/177 (2006.01)
G06F 15/16 (2006.01)
(52) U.S. Cl. .................. 709/220; 709/227
(58) Field of Classification Search .......... 709/220, 709/227
See application file for complete search history.

(56) References Cited

U.S. PATENT DOCUMENTS

2003/0191840 A1* 10/2003 Maciel ................ 709/226
2008/0294819 A1* 11/2008 Mouser et al. ........... 710/105

* cited by examiner

Primary Examiner — Tonia L Dollinger
Assistant Examiner — Mark D Fearer
(74) Attorney, Agent, or Firm — Kunzler Needham Massey & Thorpe

(57) ABSTRACT

A system and method includes providing a chassis comprising multiple slots, with each slot having a unique slot number assigned thereto. Multiple servers, each having at least one globally unique identifier associated therewith, are provided to plug into one or more of the slots. At least one storage device is provided having one or more storage volumes. To map volumes to specific servers, a volume may be assigned to a slot by identifying a slot number associated with the slot. This slot may then be mapped to a globally unique identifier associated with a server plugged into the slot. In selected embodiments, the globally unique identifier includes a WWNN, a WWPN, or other unique identifier.

4 Claims, 1 Drawing Sheet

VOLUME MAPPING BY BLADE SLOT

BACKGROUND OF THE INVENTION

Field of the Invention

This invention relates to data storage systems and more particularly to systems and methods for mapping storage volumes to servers or other devices mounted in a server chassis.

Description of the Related Art

In a client/server computing model, files may be stored on a central computer or system (e.g., a file server or storage server) to allow data to be shared by computer systems or other devices connected to a network. This centralized approach often makes it easier to backup important files since they are contained within a common repository. This approach may also make it easier to control access to files and applications, thereby improving security.

A storage server may include one or more physical storage devices, such as hard drives, tape drives, or the like, which may be formatted to include one or more storage areas, or "volumes," utilizing a single file system. When configuring these volumes, some configuration tools may allow storage volumes to be mapped to specific servers, computing devices, or other attached devices connected to a storage server, controlling which volumes can be seen and accessed by certain servers and computing devices. This capability may be used to protect sensitive information while still enabling authorized use.

Before volumes can be mapped to a specific server or computer system, some configuration tools may require a user to input a unique multi-digit alphanumeric number, such as a World Wide Node Name (WWNN), World Wide Port Name (WWPN), or other identifier used to provide addressing to a card connected to a server or computer device. These identifiers may be quite confusing as these identifiers may be completely different for different hardware manufacturers. These identifiers may also change as cards are replaced or swapped out of particular servers. In certain cases, retrieving these identifiers may require physically inspecting computer hardware or accessing the identifiers through a telnet session with a selected server or computer. In short, dealing with these identifiers can significantly complicate the process of volume mapping.

In view of the foregoing, what is needed is an improved system and method to reduce complexity when mapping storage volumes to servers or other devices mounted in a server chassis. Ideally, such a system and method would be able to perform volume mapping without requiring knowledge of identifiers such as WWNNs or WWPNs corresponding to particular servers or computing devices.

SUMMARY OF THE INVENTION

The present invention has been developed in response to the present state of the art, and in particular, in response to the problems and needs in the art that have not yet been fully solved by currently available systems and methods. Accordingly, the present invention has been developed to provide improved systems and methods for mapping storage volumes to servers or other devices mounted in a server chassis.

In a first aspect of the invention, a method in accordance with the invention includes providing a chassis comprising multiple slots, with each slot having a unique slot number assigned thereto. Multiple servers, each having at least one globally unique identifier associated therewith, are provided to plug into one or more of the slots. At least one storage device is provided having one or more storage volumes. To map volumes to specific servers, a volume may be assigned to a slot by identifying a slot number associated with the slot. This slot may then be mapped to a globally unique identifier associated with a server plugged into the slot. In selected embodiments, the globally unique identifier includes a WWNN, WWPN, or other unique identifier.

In a second aspect of the invention, a system in accordance with the invention includes a chassis having multiple slots, with each slot having a unique slot number assigned thereto. Multiple servers, each having a globally unique identifier, are provided to plug into one or more of the slots. At least one storage device having one or more storage volumes is also provided. An assignment module is provided to assign a storage volume to a specific slot by identifying the unique slot number associated with the slot. A mapping module is provided to map the slot to a globally unique identifier, such as a WWNN or WWPN associated with a server plugged into the slot.

The present invention provides a novel system and method for mapping storage volumes to servers or other devices mounted in a server chassis. The features and advantages of the present invention will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments illustrated in the appended drawings. Understanding that these drawings depict only typical embodiments of the invention and are not therefore to be considered limiting of its scope, the invention will be described and explained with additional specificity and detail through the use of the accompanying drawings, in which.

DETAILED DESCRIPTION OF THE INVENTION

Figure 1:
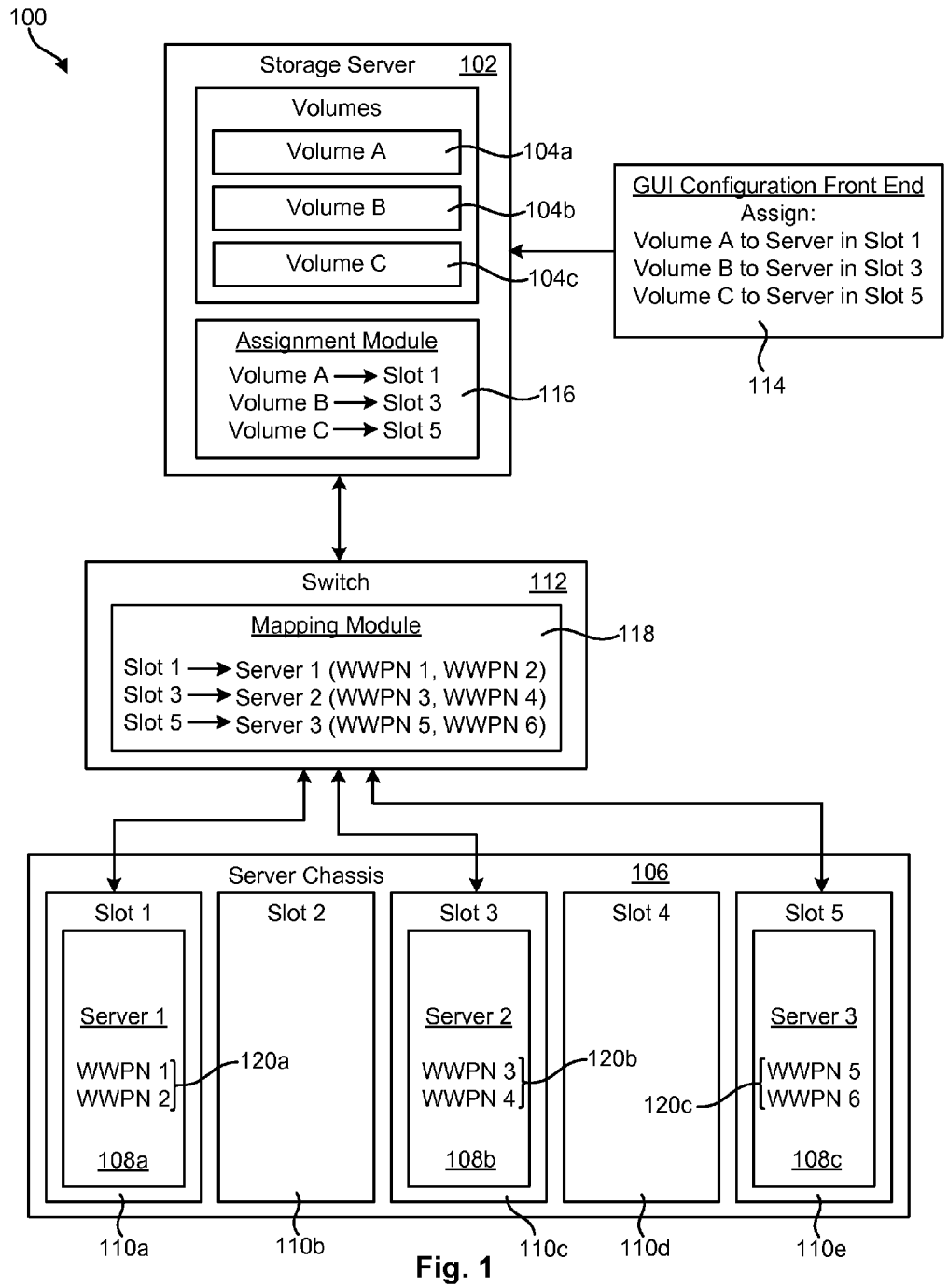
FIG. 1 is a high-level block diagram illustrating one embodiment of a system for mapping storage volumes to servers mounted in a server chassis.

It will be readily understood that the components of the present invention, as generally described and illustrated in the Figures herein, may be arranged and designed in a wide variety of different configurations. Thus, the following more detailed description of the embodiments of the systems and methods of the present invention, as represented in the Figures, is not intended to limit the scope of the invention, as claimed, but is merely representative of selected embodiments of the invention.

Some of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

Reference throughout this specification to "one embodiment," "an embodiment," or similar language means that a particular feature, structure, or characteristic described in connection with the embodiment may be included in at least one embodiment of the present invention. Thus, appearances of the phrases "in one embodiment" or "in an embodiment" in various places throughout this specification are not necessarily all referring to the same embodiment.

Furthermore, the described features, structures, or characteristics may be combined in any suitable manner in one or more embodiments. One skilled in the relevant art will recognize, however, that the invention can be practiced without one or more of the specific details, or with other methods, components, etc. In other instances, well-known structures, or operations are not shown or described in detail to avoid obscuring aspects of the invention.

The illustrated embodiments of the invention will be best understood by reference to the drawings, wherein like parts are designated by like numerals throughout. The following description is intended only by way of example, and simply illustrates certain selected embodiments of apparatus and methods that are consistent with the invention as claimed herein.

Referring to FIG. 1, in general, a system 100 in accordance with the invention may include a storage server 102 configured to contain or have access to multiple volumes 104a-c. A storage server 102, for example, may include various enterprise storage systems including but not limited to network attached storage (NAS) arrays, storage area network (SAN) arrays, servers connected to direct-attached storage (DAS) devices, or the like.

The system 100 may also include a server chassis 106 which may be used to accommodate one or more servers 108a-c. A chassis 106, hardware chassis, is a physical hardware structure used to house and retain server hardware devices used for implementing the servers 108a-c. As will be explained in more detail hereafter, one or more of the servers 108a-c may be configured to "see" and access one or more of the volumes 104a-c. In selected embodiments, the server chassis 106 may include multiple slots 110a-e which may be used to connect the servers 108a-c to the chassis 106 and provide various services to the servers 108a-c. The servers 108a-c, similarly, may occupy one or several slots 110a-e of the chassis 106. In certain embodiments, each of the slots 110a-e may be identified by a unique slot number (e.g., 1, 2, 3, etc).

In selected embodiments, the chassis 106 may be a blade chassis 106, one example of which is marketed under the BladeCenter® tradename. Similarly, the servers 108a-c may be "blade servers" 108a-c configured to plug into the blade chassis 106. These servers 108a-c may have various internal components removed to reduce their size and enable packing at higher densities. The blade chassis 106, in selected embodiments, maybe used to provide services such as power, networking, cooling, storage, as well as various interconnects to the servers 108a-c.

The servers 108a-c may be configured to function as web servers, file servers, applications servers, database servers, or the like. For the purposes of this specification, the term "server" may include any type of device that is mapped to one or more of the logical volumes 104a-c, and may include devices to provide switching, routing, storage, or other services.

In certain embodiments, a switch 112 may be provided to control communication between the servers 108a-c and the logical volumes 104a-c. The switch 112 may, in certain embodiments, be integrated into the server chassis 106. In one embodiment, the switch 112 is a serially-attached SCSI (SAS) switch 112 or fiber-optic switch 112. A SAS switch 112, for example, may be used to control communication between multiple SAS-configured servers 108a-c and SAS-configured storage arrays 102.

In selected embodiments, the storage server 102 may include a GUI configuration front end 114 to configure the storage server 102. This front end 114 may enable a user to map specific volumes 104a-c to one or more of the servers 108a-c and thereby control access to the volumes 104a-c.

As previously mentioned, some prior configuration tools may require a user to input a unique multi-digit alphanumeric number, such as a World Wide Node Name (WWNN), World Wide Port Name (WWPN), or other identifier or address associated with a card on a server 108a-c before a volume 104a-c can be mapped to the server 108a-c. These identifiers may be long (e.g., 16 bits) and confusing in that they may differ significantly for different manufacturers. These identifiers may also change when a card is replaced or swapped out of a particular server 108a-c. In other cases, the identifiers may not be readily available and may require visiting the server 108a-c or retrieving the identifiers through a telnet session.

In selected embodiments in accordance with the invention, an assignment module 116 and mapping module 118 may be provided to mask the complexity of the WWNN and WWPN identifiers from a user. Instead of requiring input of the WWNN and WWPN identifiers, the modules may allow a user to map volumes 104a-c to specific slots 110a-e in the chassis 106. For example, in selected embodiments, an assignment module 116 may enable a user to assign volumes 104a-c to slots 110a-e of the chassis 106. In selected embodiments, a user may make these assignments through the GUI configuration front end 114. As shown by way of example, volume A may be assigned to slot 1, volume B may be assigned to slot 3, and volume C may be assigned to slot 5. In effect, these assignments allocate the volumes 104a-c to the servers 108a-c inserted into the slots 110a, 110c, 110e.

A mapping module 118, by contrast, may be provided to correlate the slot numbers 110a, 110c, 110e with the servers 108a-c and their associated WWNN and WWPN identifiers 120a-c. In selected embodiments, the mapping module 118 may be located in and executed by the switch 112. The switch 112 may, in certain embodiments, be configured to discover the WWNN and WWPN identifiers of the servers 108a-c or other devices 108a-c installed in the slots 110a-e. In this way, the switch 112 may be able to correlate the slots 110a-e with the servers 108a-c and corresponding WWNN and WWPN identifiers 120a-c.

As shown by the example of FIG. 1, slot 1 may be mapped to server 1 having WWPN 1 and WWPN 2. Slot 3 may be mapped to server 2 having WWPN 3 and WWPN 4. Similarly, slot 5 may be mapped to server 3 having WWPN 5 and WWPN 6. Because the slot number is correlated with a specific server 108a-c and WWNN and WWPN identifiers 120a-c inside the switch 112, the user can map volumes 104a-c to these servers 108a-c knowing only the slot number 110a, 110c, 110e and without any knowledge of the WWNN and WWPN identifiers 120a-c. This improvement simplifies and speeds up the volume mapping process.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A computer implemented method for mapping storage volumes to servers or other devices mounted in a server chassis:
   providing a chassis comprising a plurality of slots, each slot having a unique slot number assigned thereto;
   providing a plurality of servers, each server configured to plug into at least one of the slots, each server having a globally unique identifier associated therewith, wherein the globally unique identifier comprises at least one of a World Wide Node Name ("WWNN") and World Wide Port Name ("WWPN");
   providing at least one storage device comprising a plurality of storage volumes;
   assigning a storage volume to a server configured in a specific slot of the chassis by specifying the unique slot number assigned to the specific slot without specifying a globally unique identifier associated with a server plugged into the specific slot; and
   mapping the specified unique slot number assigned to the specific slot to a globally unique identifier associated with a server plugged into the specific slot.

2. The method of claim 1, wherein mapping further comprises automatically discovering the globally unique identifier.

3. A system comprising:
   a hardware chassis comprising a plurality of slots, each slot having a unique slot number as signed thereto;
   a plurality of servers, each server configured to plug into at least one of the slots, each server having a globally unique identifier associated therewith, wherein the globally unique identifier comprises at least one of a World Wide Node Name ("WWNN") and World Wide Port Name ("WWPN");
   at least one storage device comprising a plurality of storage volumes;
   an assignment module to enable an administrator to assign a storage volume to a server configured in a specific slot of the chassis by specifying the unique slot number assigned to the specific slot without specifying a globally unique identifier associated with a server plugged into the specific slot; and
   a mapping module to map the specified unique slot number assigned to the specific slot to a globally unique identifier associated with a server plugged into the specific slot.

4. The system of claim 3, further comprising a switch connecting the plurality of servers to the at least one storage device, the switch configured to automatically discover the globally unique identifiers associated with the servers.

* * * * *